United States Patent
Kim (10) Patent No.: US 7,050,121 B2
(45) Date of Patent: May 23, 2006

(54) METHOD AND DEVICE FOR COMPENSATING PICTURE QUALITY OF PROJECTION TYPE DISPLAY

(75) Inventor: Dong Hyeon Kim, Taegu-kwangyokshi (KR)

(73) Assignee: LG Electronics Inc., Seoul (KR)

( * ) Notice: Subject to any disclaimer, the term of this patent is extended or adjusted under 35 U.S.C. 154(b) by 573 days.

(21) Appl. No.: 10/038,671

(22) Filed: Jan. 8, 2002

(65) Prior Publication Data

US 2002/0089611 A1    Jul. 11, 2002

(30) Foreign Application Priority Data

Jan. 8, 2001    (KR) ................. P2001-980

(51) Int. Cl.
H04N 5/64    (2006.01)
H04N 9/73    (2006.01)

(52) U.S. Cl. .............. 348/744; 348/658; 348/602; 348/603

(58) Field of Classification Search ........... 348/744, 348/745, 746, 747, 658, 191, 602, 603
See application file for complete search history.

(56) References Cited

U.S. PATENT DOCUMENTS

| | | | | |
|---|---|---|---|---|
| 5,231,481 A | * | 7/1993 | Eouzan et al. | 348/658 |
| 5,315,378 A | * | 5/1994 | Satou et al. | 348/655 |
| 5,452,019 A | * | 9/1995 | Fukuda et al. | 348/655 |
| 5,793,441 A | | 8/1998 | Hagerman | 348/658 |
| 5,889,614 A | * | 3/1999 | Cobben et al. | 359/483 |

FOREIGN PATENT DOCUMENTS

| | | |
|---|---|---|
| CN | 1092233 | 9/1994 |
| EP | 0595649 A1 | 10/1993 |
| EP | 0989757 A1 | 3/2000 |
| EP | 1065889 A1 | 1/2001 |
| EP | 1079605 A1 | 2/2001 |
| JP | 08-056366 | 2/1996 |
| JP | 08-079787 | 3/1996 |
| JP | 09-037281 | 2/1997 |
| WO | 01/06311 A1 | 1/2001 |

* cited by examiner

Primary Examiner—Michael H. Lee (74) Attorney, Agent, or Firm—Fleshner & Kim LLP

(57) ABSTRACT

Device and method for compensating a picture quality of a projection type display, the device including a screen for displaying a picture projected from outside of the screen, a video processing part for receiving, and converting an analog video signal into a digital video signal, and adjusting an offset and a gain thereof, for making the video signal displayable on the screen, a sensing part for sensing the video signal from the video processing part and projected to a region of the screen, a memory part for storing reference video information, and a microcomputer for projecting the reference video information stored at the memory part onto the screen through the video processing part according to a user's picture quality compensation command, or a preset algorithm, and controlling the video processing part so that a luminance and chromaticity of the picture are calculated according to an output of the sensing part, the luminance and the chromaticity of picture are compared to preset values, and a compensation is made according to a result of the comparison, thereby automatically compensating a picture quality deterioration to an optimal condition to prevent a picture quality deterioration regardless of factors that affect the picture quality.

26 Claims, 5 Drawing Sheets

METHOD AND DEVICE FOR COMPENSATING PICTURE QUALITY OF PROJECTION TYPE DISPLAY

This application claims the benefit of the Korean Application No. P2001-00980 filed on Jan. 8, 2001, which is hereby incorporated by reference.

BACKGROUND OF THE INVENTION

1. Field of the Invention

The present invention relates to a display, and more particularly, to device and method for compensating a picture quality of a projection type display, such as a projection TV, or a projector.

2. Background of the Related Art

A picture on the display, such as a TV receiver or a monitor, may have color, and luminance feeling of a user varied with an external illumination, that vary a user's eye tiredness. In general, the luminance of the picture has been adjusted to an optimum value according to the luminance of the external illumination for minimizing the user's eye tiredness, and a color intensity of the picture has been adjusted to an optimum value according to the color intensity of the external illumination for minimizing a variation of color feeling of the user.

The foregoing methods have been employed under the assumption that the luminance of the display, such as a TV CRT that is luminescence by itself, is basically not influenced from the external illumination at all, and what exist are only variations of luminance, and color feeling of the user caused by the external illumination. The foregoing methods have been also employed under the assumption that the TV receiver is installed close to a wall, and most of the influences from the external illumination are caused by a light incident on a front surface of the TV receiver, and a light reflected at the wall.

In the foregoing methods, the luminance and chromaticity of illumination in the vicinity of the TV receiver are calculated by an optical sensor fitted to a part of a front surface of the TV receiver, and the luminance and chromaticity of the picture are adjusted automatically according to preset luminance and chromaticity.

The foregoing methods are applicable also to a plasma display panel (PDP) or liquid crystal display (LCD) type TV receiver, because, alike the CRT type TV receiver, the plasma display panel (PDP) or liquid crystal display (LCD) type TV receiver has no variation of color reproduction characteristics of the picture itself caused by the external illumination since they reproduce a color by its own luminescence, but has variation of relative color and luminance of user caused by the external illumination only.

Figure 1:
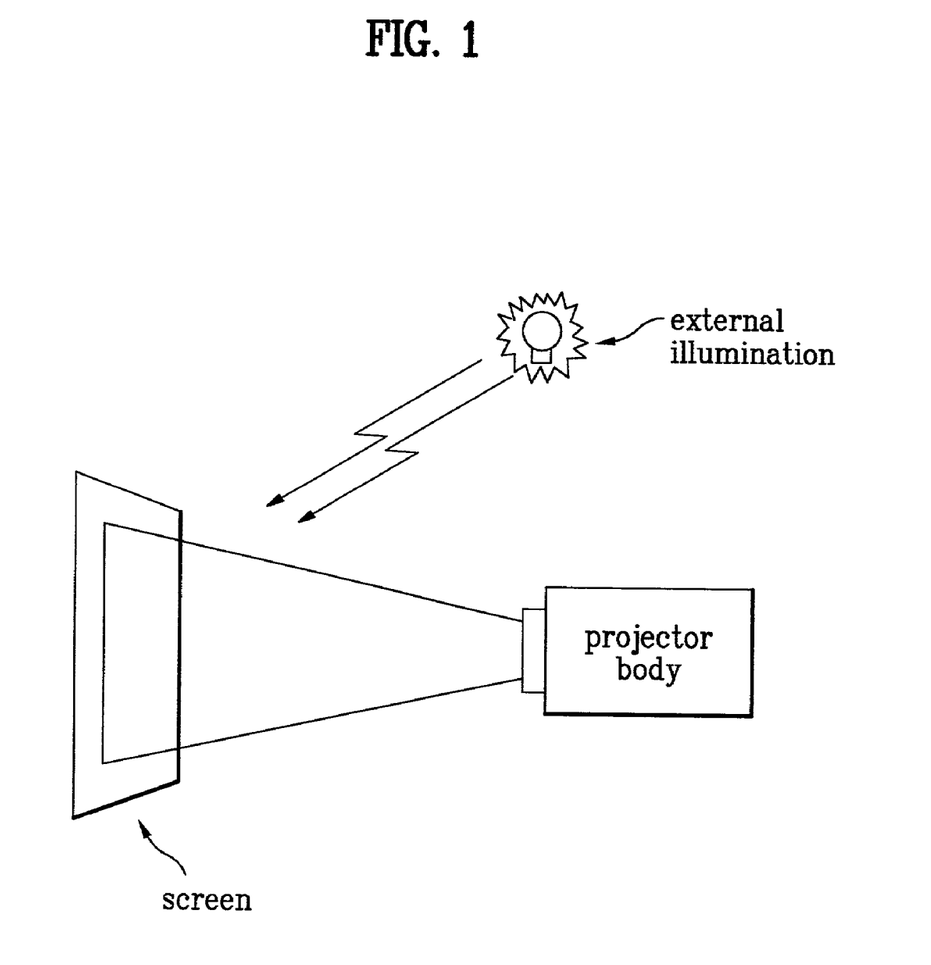
FIG. 1 illustrates a projector in a projection type display, schematically.
Figure 2:
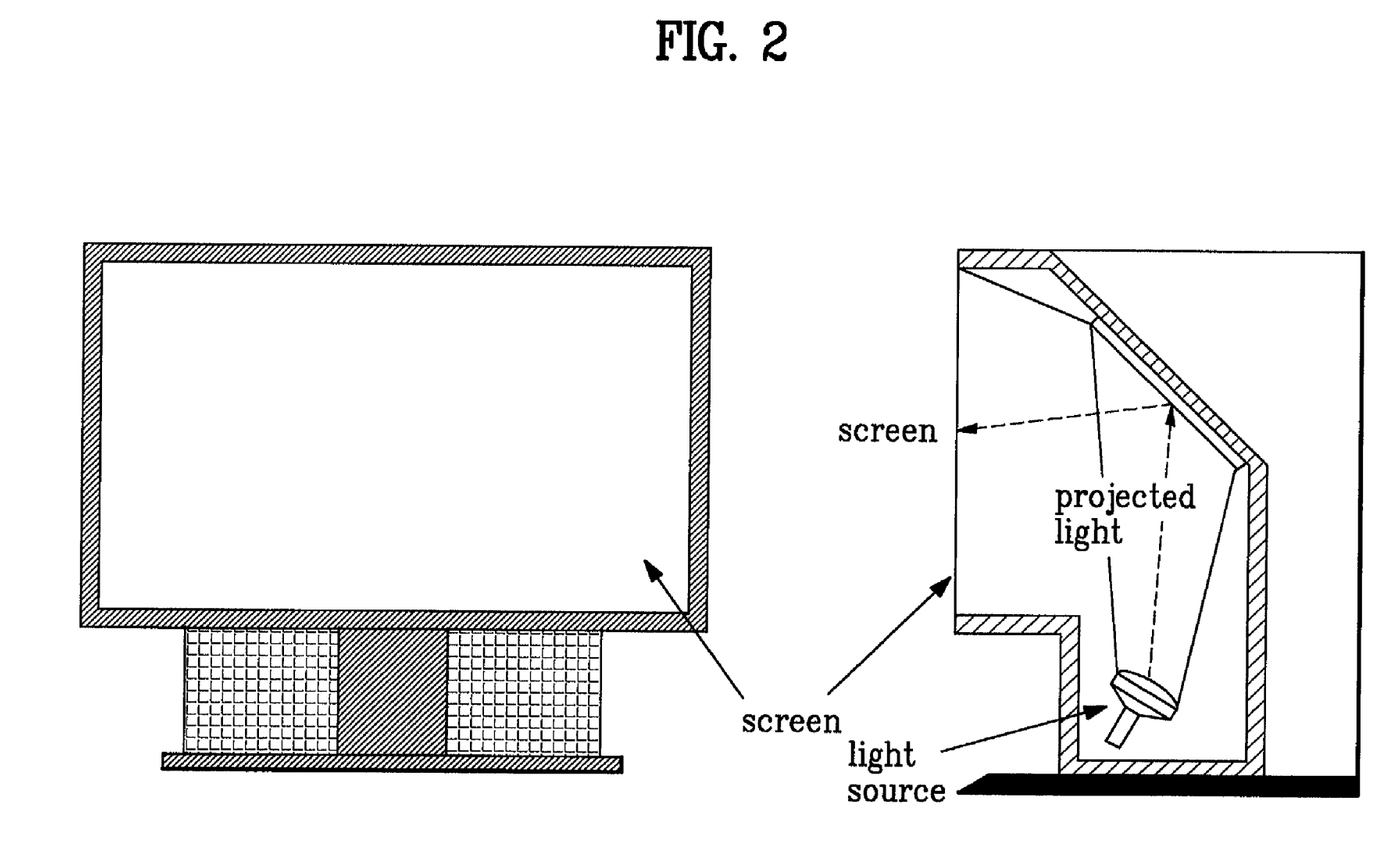
FIG. 2 illustrates a projection TV in a projection type display, schematically.

In the meantime, because, as typical examples of the projection type display, a projector having a projector body for providing a light inclusive of a picture and a screen for displaying the light as shown in FIG. 1, or a projection TV as shown in FIG. 2, forms the picture on the screen, not by a light emitted from the panel itself, but by a light transmitted through, or reflected at the panel, a color sense of the picture can also be varied with luminance and chromaticity of the light projected thereto, a light from an external illumination, and reflectivity and color of the screen, substantially.

However, currently, there is no technology suggested for compensating a screen luminance or a color feeling of the projection type display. The compensating methods used in the foregoing direct type display can not be applied to the projection type display because the chromaticity itself of the picture on the screen can vary with a color of the screen itself and the chromaticity of the external illumination.

Therefore, the related art projection type display has a problem in that the picture quality deterioration can not be avoided because the abnormal variation of the luminance and chromaticity of the picture caused by the external illumination and screen characteristics can not be compensated.

SUMMARY OF THE INVENTION

Accordingly, the present invention is directed to device and method for compensating a picture quality of a projection type display that substantially obviates one or more of the problems due to limitations and disadvantages of the related art.

An object of the present invention is to provide device and method for compensating a picture quality of a projection type display, in which a picture quality is always compensated to an optimum state automatically regardless of factors giving influences to the picture quality, for prevention of a picture quality deterioration.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for compensating a picture quality of a projection type display includes a screen for displaying a picture projected from outside of the screen, a video processing part for receiving, and converting an analog video signal into a digital video signal, and adjusting an offset and a gain thereof, for making the video signal displayable on the screen, a sensing part for sensing the video signal from the video processing part and projected to a region of the screen, a memory part for storing reference video information, and a microcomputer for projecting the reference video information stored at the memory part onto the screen through the video processing part according to a user's picture quality compensation command, or a preset algorithm, and controlling the video processing part so that a luminance and chromaticity of the picture are calculated according to an output of the sensing part, the luminance and the chromaticity of picture are compared to preset values, and a compensation is made according to a result of the comparison.

In another aspect of the present invention, there is provided a method for compensating a picture quality of a projection type display having a body and a screen, including the steps of (a) the body projecting, and displaying a first reference picture on the screen, detecting a displayed picture, and calculating a chromaticity of the picture according to a user's command, or a preset algorithm, (b) increasing an offset value of a color signal in R/G/B color signals, which lacks chromaticity, until the offset value is within a normally allowable range if the chromaticity calculated for the first reference picture is within a correctable range, and outside of the normally allowable range, (c) the body projecting, and displaying a second reference picture on the screen, detecting a displayed picture, and calculating luminance and chromaticity of the displayed picture, and (d) increasing a luminance output level of the second reference picture to an optimal luminance step by step to complete a luminance compensation, and decreasing a gain of a color signal in the R/G/B color signals, which has an excessive chromaticity, until the gain is within a normally allowable range if the chromaticity calculated for the second reference picture is outside of the normally allowable range, thereby completing the compensation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings FIGS. 3–7.

Figure 3:
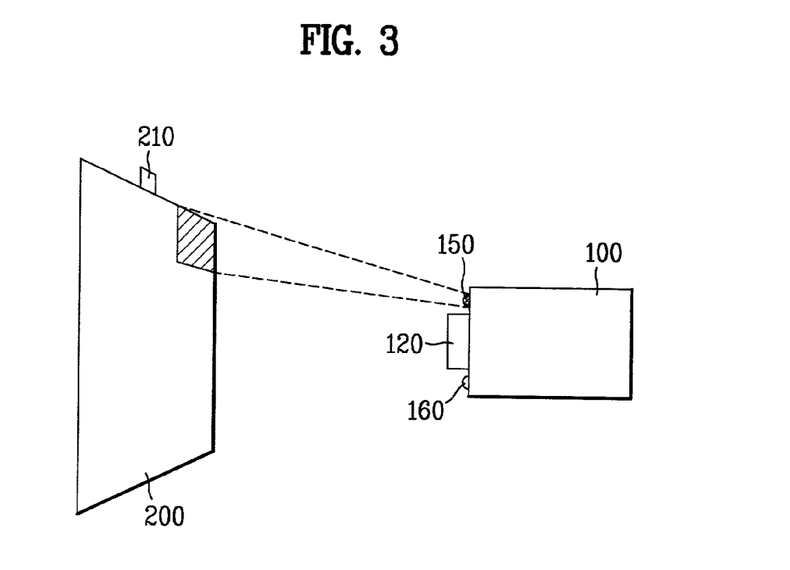
FIG. 3 illustrates a block diagram showing a system of a device for compensating picture luminance/chromaticity of a projection type display in accordance with a preferred embodiment of the present invention.

Referring to FIG. 3, a device for compensating a picture quality of a projection type display in accordance with a preferred embodiment of the present invention includes a projector body 100 for providing a light inclusive of a picture, and a screen 200 for displaying the light from the projector body 100, detecting an environmental light, and transmitting a detected value of the environmental light to the projector body 100 in an UV ray.

There is an optical detection/transmission part 210, fitted to a region of the screen 200 at which an environment light detection is easy, having an optical sensor and a UV transmitter for detection of the environmental light and transmission of a result of the detection to the body 100 in a UV form.

Figure 4:
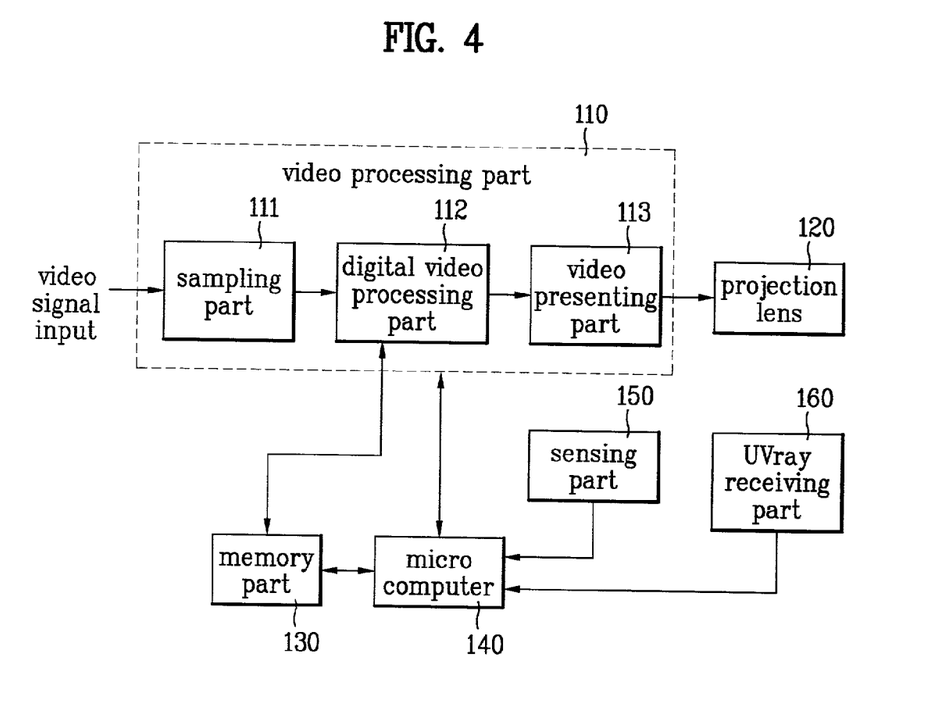
FIG. 4 illustrates a block diagram of a system of the body of the device in FIG. 2.

Referring to FIG. 4, the projector body 100 includes a video processing part 110 having a sampling part 111 for receiving and converting an analog video signal into a digital video signal, a digital video processing part 112 for adjusting an offset and a gain of the digital video signal from the sampling part 111, and a video presenting part 113 for presenting an output from the digital video processing part 112 as a displayable video signal, a projection lens 120 for projecting an output of the video processing part 110 to the screen 100, a memory part 130 for storing compensation reference video information, a sensing part 150 for detecting a luminance and a chromaticity of the compensation reference video displayed in a region of the screen 200, a UV receiving part 160 for receiving the UV signal from the optical detection/transmission part 210 and transferring to a microcomputer 140, and the microcomputer 140 for providing a control signal to the video processing part 110 for presenting the compensation reference video stored in the memory 130 according to a users command, a preset algorithm, or an environmental light detection value from the UV receiving part 160, and optimum compensation of the luminance and chromaticity of the picture according to the luminance and chromaticity of the picture detected at the sensing part 150.

Figure 5:
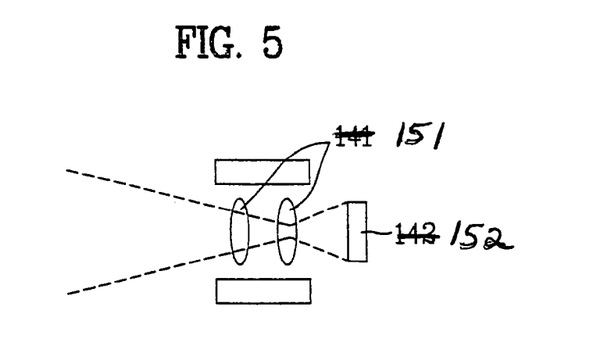
FIG. 5 illustrates a layout showing a system of the sensing part in FIG. 2.

Referring to FIG. 5, the sensing part 150 includes an optical sensor 152 for converting the light incident thereon into an electrical signal, and a focusing lens system 151 for directing, and focusing a light displayed on the screen 200 onto the optical sensor 152.

The operation of the device for compensating a picture quality of a projection type display in accordance with a preferred embodiment of the present invention will be explained.

The video processing part 110 receives, and samples the analog video signal at fixed intervals, converts into a digital video signal, and adjusts offset and gain thereof, and processes the video signal to be displayable on the screen, and provides to the projection lens 120. Then, the projection lens 120 projects the picture on the screen.

In this instance, the optical detection/transmission part 210 in a region of the screen 200 detects an environmental light and converts into a UV signal, and transmits to the body 100. The UV ray receiving part 160 in the body 100 receives the UV signal, converts into an electrical signal, and transfers to the microcomputer 140.

The microcomputer 140 stores an output of the UV ray receiving part 160 at the memory part 130, compares to a previous optical detection value stored already, and conducts a picture quality compensation operation according to a difference of the present optical detection value and the previous optical detection value. Other than the comparison of the optical detection values, the picture quality compensation operation may be carried out according to separate user's picture quality compensation command, or the like.

The foregoing picture quality compensation operation will be explained in detail.

Figure 7:
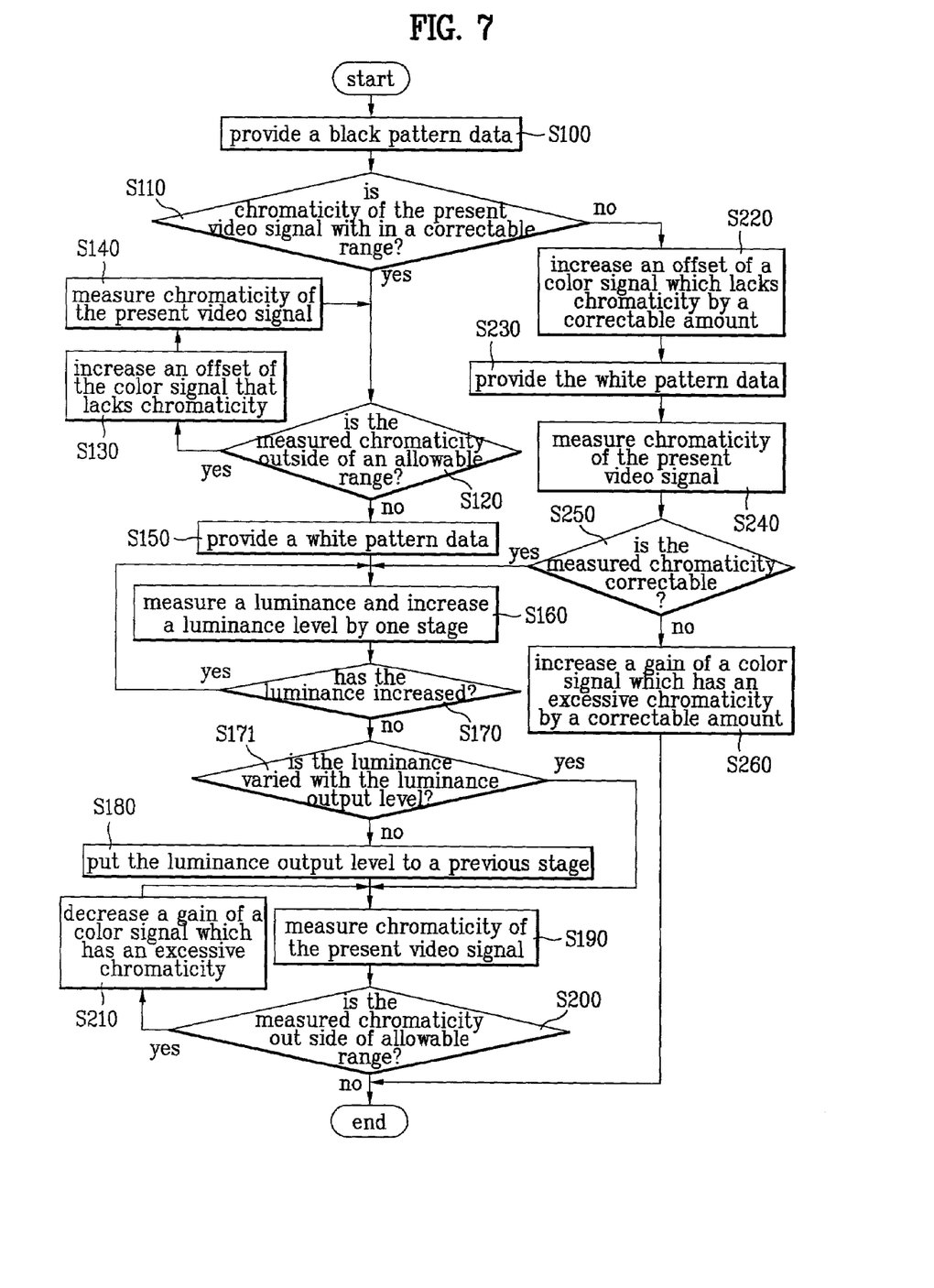

Referring to FIG. 7, if there is a difference of a present optical detection value and a previous optical detection value over a present level, black pattern video information is provided to a video processing part 110 from compensation reference video information (white pattern, and black pattern) stored in the memory part 130 for checking variation of luminance and chromaticity of the picture displayed on the screen 200 (S100). The black pattern video information is a minimum value of a digital data value processed in the video processing part 110.

Figure 6A:
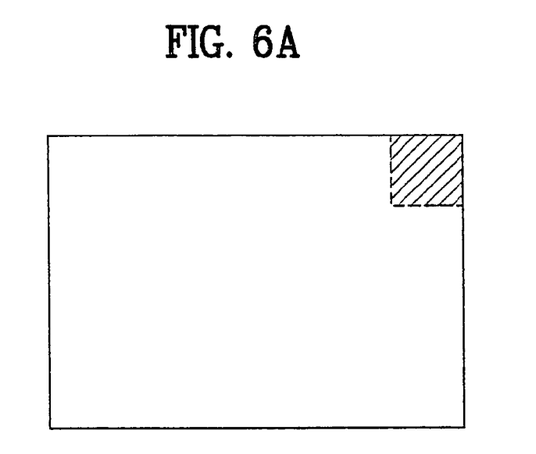
FIGS. 6A and 6b illustrate display examples of image patterns for compensating a picture of the present invention; and, FIG. 7 illustrates a flow chart showing a method for compensating a picture luminance and chromaticity of a projection type display of the present invention.
Figure 6B:
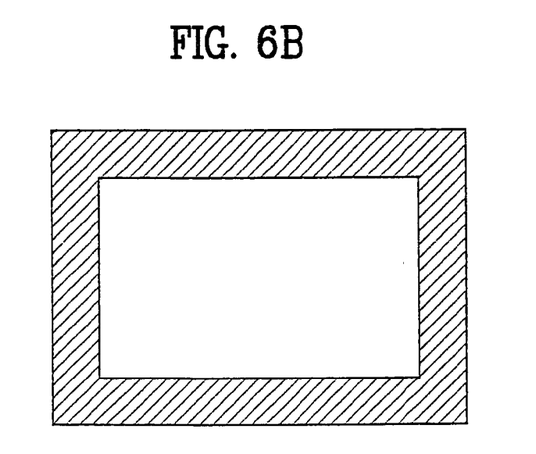

Then, the video processing part 110 processes the compensation reference video information into a picture, and displays in a central part of the screen 200, or, as shown in FIG. 6A or 6B, along a preset width of a periphery of the screen, or only in a part of the periphery. The picture is displayed as shown in FIG. 6A or 6B for minimizing feeling of rejection of the user.

The sensing part 150 focuses on the picture displayed in the central part, or as shown in FIG. 6A, or 6B. The sensing part 150 detects a light of the picture displayed on the screen 200, and transfers the detected value to the microcomputer 140. Then, the microcomputer 140 detects a chromaticity of the picture displayed on the screen presently according to the detected value at the sensing part 150. And, the microcomputer 140 calculates the chromaticity by using the detected value at the sensing part 150, and determines the calculated chromaticity being within a correctable range (S110).

If the calculated chromaticity is within a correctable range as a result of the determination (S110), the microcomputer 140 determines the calculated chromaticity being within a normally allowable range (S120). If the calculated chromaticity is not within the normally allowable range, i.e., abnormal, as a result of the determination (S120), an offset value of a color signal in R/G/B color signals which lacks a chromaticity value is increased (S130), because the black pattern video information is a minimum value of a digital data, and the chromaticity is calculated (S140) again at the sensing part 150, to return to the step (120).

That is, under the control of the microcomputer 140, the digital video processing part 112 in the video processing part 110 increases an offset of a color signal in the digital video signals from the sampling part 111, which lacks chromaticity, and transfers to the video presenting part 113, and the video presenting part 113 processes the digital video signal having the increased offset value displayable on the screen, and displays on the screen 200 through the projection lens 120.

Then, when the sensing part 150 senses the video signal displayed on the screen 200, and transmits to the microcomputer 140, the microcomputer 140 calculates chromaticity of the sensed video signal, and controls the video processing part 110 such that the chromaticity is within the allowable range.

Thus, if the calculated chromaticity is within the allowable range as a result of the determination (S120), which implies a chromaticity correction of the black pattern is completed, luminance correction and chromaticity correction of the white pattern are carried out.

The microcomputer 140 makes the white pattern video information provided from the memory part 130 to the video processing part 110 (S150). The white pattern video information is a maximum value of the digital data processed in the video processing part 110. The video processing for the white pattern, display, and sensing of the displayed picture are identical to the case of the black pattern, of which detailed explanations will be omitted.

Accordingly, the microcomputer 140 calculates the luminance of the white pattern picture through the signal sensed at the sensing part 150, increases a present luminance output level by one stage (S160), calculates the luminance of the picture detected at the sensing part 150, and determines an actual increase of the luminance (S170).

If the present luminance increases as a result of the determination (S170), the foregoing steps (S160), and (S170) are repeated until the luminance increases no more. That is, the luminance output level is increased step by step in succession until the present luminance reaches to an optimal level.

If the luminance increases no more as a result of the determination (S170), an actual luminance change following the luminance output level change is determined (S171), determining that an original luminance is optimum if there is no actual luminance change following the luminance output level change, the luminance output level is returned to an original state, i.e., to a state one step before (S180).

Opposite to this, if there is an actual luminance change following the luminance output level change, i.e., the luminance is optimized following conduction of the steps (S160) and (S170), the present luminance output level is maintained.

Upon completion of the luminance correction thus, chromaticity correction for the white pattern video is required.

Accordingly, the microcomputer 140 calculates chromaticity of the white pattern picture displayed on the screen presently by using a detection value at the sensing part 150, determines the calculated chromaticity of being within the allowable range (S200). If the calculated chromaticity is within the allowable range as a result of the determination (S200), it can be known that optimum luminance correction of the screen and optimum white level chromaticity correction following the luminance correction are made.

Opposite to this, if the calculated chromaticity is not within the allowable range as a result of the determination (S200), the gain of the color signal in the R/G/B color signals, which has an excessive chromaticity is reduced as the white pattern video information is the maximum value among the digital data values (S210). Then, the foregoing steps (S190~S210) are repeated so that the chromaticity of the white pattern picture is corrected to an optimum value.

Because the gain correction operation is made in the digital video processing part 112 in video processing part 110 under the control of the microcomputer 140 by a method identical to the foregoing offset correction operation for the black pattern picture, a detailed explanation will be omitted.

In the meantime, if the calculated chromaticity of the black pattern picture detected at the sensing part 150 is outside of a correctable range as a result of the determination (S110), an offset of a color signal in the R/G/B color signals, which lacks the chromaticity, is increased within a correctable range (S220). Then, the microcomputer 140 controls such that the white pattern video information is provided from the memory part 130 (S230), and displayed on the screen 200 through the video processing part 110.

Then, the microcomputer 140 calculates chromaticity of the white pattern picture according to the output of the sensing part 150 (S240), and determines the calculated chromaticity within a correctable range (S250). If the calculated chromaticity is outside of the correctable range as a result of the determination (S250), a gain of a color signal in the R/G/B color signals, which has an excessive chromaticity, is reduced within the correctable range (S260). Opposite to this, if the calculated chromaticity is within the correctable range as a result of the determination (S250), the process returns to the step (S160), to make chromaticity correction for the luminance and the white pattern picture through the foregoing steps (S170~S210).

The foregoing embodiment of the present invention is a description of a system in which a variation of an environment light of a screen is sensed automatically, and a picture quality correction is made. However, since the foregoing basic picture quality correction algorithm has no change even if the automatic sensing function is excluded (by changing the optical detection/transmission device at the screen, the UV ray receiver at the body, and the algorithm in the microcomputer), it can be known that the present invention is not limited to the present embodiment, but different variations are possible.

As has been explained, the device and method for compensating a picture quality of a projection type display can provide an optimal picture quality to improve a product reliability of user regardless of environment illumination, because the environmental luminance variation is detected automatically, and optimal chromaticity and luminance correction are carried out, or the chromaticity and the luminance corrections are made manually in correspondence to the present luminance.

It will be apparent to those skilled in the art that various modifications and variations can be made in the device and method for compensating a picture quality of a projection type display of the present invention without departing from the spirit or scope of the invention. Thus, it is intended that the present invention cover the modifications and variations of this invention provided they come within the scope of the appended claims and their equivalents.

What is claimed is:

1. A device for compensating a picture quality of a projection type display comprising:
   a screen for displaying a picture projected from outside of the screen;
   an optical detection/transmission part for detecting an environmental light of the screen, and transmitting in a form of a UV ray;
   a video processing part for receiving, and converting an analog video signal into a digital video signal, and adjusting an offset and a gain thereof, for making the video signal displayable on the screen;
   a sensing part for sensing the video signal from the video processing part and projected to a region of the screen;
   a memory part for storing reference video information;
   a UV receiving part for receiving the UV ray signal from the optical detection/transmission part; and
   a microcomputer for projecting the reference video information stored at the memory part onto the screen through the video processing part according to a user's picture quality compensation command, or a preset algorithm, and controlling the video processing part so that a luminance and chromaticity of the picture are calculated according to an output of the sensing part, the luminance and the chromaticity of picture are compared to preset values, and a compensation is made according to a result of the comparison.

2. A device as claimed in claim 1, wherein the sensing part includes;
   a focusing lens focused on a region of the screen; and
   an optical sensor.

3. A device as claimed in claim 1, wherein the reference video information in the memory part includes black pattern video information and white pattern video information.

4. A device as claimed in claim 1, wherein the optical detection/transmission part is fitted to a region of the screen.

5. A device as claimed in claim 1, wherein the optical detection/transmission part includes:
   an optical sensor for detecting an environmental light of the screen; and
   a UV ray transmitter for converting the detected environment light into a form of a UV ray, and transmitting to the UV ray receiving part.

6. A method for compensating a picture quality of a projection type display having a body and a screen, comprising the steps of:
   (a) the body projecting, and displaying a first reference picture on the screen, detecting a displayed picture, and calculating a chromaticity of the picture according to a user's command, or a preset algorithm;
   (b) increasing an offset value of a color signal in R/G/B color signals, which lacks chromaticity, until the, offset value is within a normally allowable range if the chromaticity calculated for the first reference picture is within a correctable range, and outside of the normally allowable range;
   (c) the body projecting, and displaying a second reference picture on the screen, detecting a displayed picture, and calculating luminance and chromaticity of the displayed picture; and
   (d) increasing a luminance output level of the second reference picture to an optimal luminance step by step to complete a luminance compensation, and decreasing a gain of a color signal in the R/G/B color signals, which has an excessive chromaticity, until the gain is within a normally allowable range if the chromaticity calculated for the second reference picture is outside of the normally allowable range, thereby completing the compensation.

7. A method as claimed in claim 6, wherein the first reference picture is a black pattern, and the second reference picture is a white pattern.

8. A method as claimed in claim 6, wherein the first reference picture and the second reference picture are displayed along a width of a periphery of the screen, respectively.

9. A method as claimed in claim 6, wherein the first reference picture and the second reference picture are displayed in a part of a periphery of the screen, respectively.

10. A method as claimed in claim 6, further comprising the step of increasing an offset of a color signal in the R/G/B color signals, which has an excessive chromaticiry, until the offset reaches to a preset correctable range if the chromaticity calculated for the first reference picture is outside of the correctable range, thereby completing the compensation.

11. A method as claimed in claim 6, further comprising the step of putting the luminance output level back to a value before the luminance output level is increased in a case there is no actual luminance increase following the increase of the luminance output level for the second reference picture.

12. A method as claimed in claim 6, further comprising the step of decreasing a gain of a color signal in the R/G/B color signals, which has an excessive chromaticity, until the gain reaches to a preset correctable range if the chromaticity calculated for the second reference picture is outside of the correctable range, thereby completing the compensation.

13. A method as claimed in claim 6, wherein the first reference picture is a minimum value of a digital data value, and the second reference picture is a maximum value of the digital data value.

14. A method for compensating a picture quality of a projection type display having a body, a screen, and an optical detection/transmission means for detecting an environmental light of the screen and transmitting to the body, comprising the steps of:
   (a) the body projecting, and displaying a first reference picture on the screen, detecting a displayed picture, and calculating a chromaticity of the picture according to a variation of the environmental light of the screen;
   (b) increasing an offset value of a color signal in R/G/B color signals, which lacks chromaticity, until the offset value is within a normally allowable range if the chromaticity calculated for the first reference picture is within a correctable range, and outside of the normally allowable range;
   (c) the body projecting, and displaying a second reference picture on the screen, detecting a displayed picture, and calculating luminance and chromaticity of the displayed picture; and (d) increasing a luminance output level of the second reference picture to an optimal luminance step by step to complete a luminance compensation, and decreasing a gain of a color signal in the R/G/B color signals, which has an excessive chromaticity, until the gain is within a normally allowable range if the chromaticity calculated for the second reference picture is outside of the normally allowable range, thereby completing the compensation.

15. A method as claimed in claim 14, wherein the 6rst reference picture is a black pattern, and the second reference picture is a white pattern.

16. A system for adjusting parameters of an image produced by a projection display, comprising:
   a screen;
   an optical detector for detecting ambient light at the screen and transmitting a UV signal indicative of a magnitude of the detected ambient light;
   a receiver for receiving the signal transmitted by the optical detector;
   a video processor for receiving a video signal and projecting an image based on the video signal onto the screen;
   a sensor for monitoring at least a portion of the image on the screen; and
   a processor for receiving monitoring information from the sensor and adjusting parameters of the projected image via the video processor based on the monitoring information.

17. The system of claim 16, wherein the receiver comprises a UV receiver.

18. The system of claim 16, wherein the sensor is positioned away from the screen.

19. The system of claim 16, wherein the sensor comprises:
   an optical sensor; and
   a lens for imaging at least a portion of the screen onto the optical sensor.

20. The system of claim 16, wherein the parameters of the projected image comprise luminance and chromaticiry.

21. The system of claim 16, further comprising a memory for storing reference video information.

22. The system of claim 16, wherein the video processor is adapted to project a reference image based on the reference video information onto at least a portion of the screen, and the sensor is adapted to remotely monitor the reference image.

23. The system of claim 16, wherein the processor is adapted to compare parameters of the monitored image with predetermined parameters.

24. The system of claim 16, wherein the optical detector is positioned on the screen.

25. A method of adjusting parameters of an image produced by a projection display, comprising:
   projecting a first reference image onto a screen;
   determining a chromaticity of the projected first reference image;
   determining a color signal whose chromaticity is different than a desired value;
   adjusting, if the determined chromaticity of the projected first reference image is within a correctable range and outside a predetermined normal range, an offset value of the determined color signal until the offset value is within a predetermined normal range;
   projecting a second reference image onto the screen;
   calculating a luminance and chromaticity of the projected second reference image;
   adjusting a luminance level of the projected second reference image to a predetermined optimal luminance value; and
   adjusting, if the chromaticity of the projected second reference image is outside a predetermined normal range, a gain of a color signal until the gain of the color signal is within a predetermined normal range.

26. The method of claim 25, wherein the first and second reference images are projected Onto a peripheral portion of the screen.

* * * * *